(12) United States Patent
Park et al.

(10) Patent No.: US 7,809,048 B2
(45) Date of Patent: Oct. 5, 2010

(54) ON-CHANNEL REPEATING APPARATUS AND METHOD FOR TERRESTRIAL DIGITAL TELEVISION BROADCASTING SERVICE

(75) Inventors: Sung-Ik Park, Daejon (KR); Yong-Tae Lee, Daejon (KR); Seung-Won Kim, Daejon (KR); Soo-In Lee, Daejon (KR); Ho-Min Eum, Daejon (KR); Jae-Hyun Seo, Daejon (KR)

(73) Assignee: Electronics and Telecommunications Research Institute (KR)

( * ) Notice: Subject to any disclaimer, the term of this patent is extended or adjusted under 35 U.S.C. 154(b) by 1725 days.

(21) Appl. No.: 10/750,029

(22) Filed: Dec. 30, 2003

(65) Prior Publication Data

US 2004/0237117 A1 Nov. 25, 2004

(30) Foreign Application Priority Data

May 20, 2003 (KR) ...................... 10-2003-0032007

(51) Int. Cl.
*H04B 3/36* (2006.01)

(52) U.S. Cl. ...................... 375/214; 375/211; 375/215; 455/11.1; 455/13.2

(58) Field of Classification Search ................. 375/211, 375/214, 215; 455/11.1, 13.2
See application file for complete search history.

(56) References Cited

U.S. PATENT DOCUMENTS

| | | | | |
|---|---|---|---|---|
| 5,502,506 A | * | 3/1996 | Choi | 348/607 |
| 6,335,767 B1 | * | 1/2002 | Twitchell et al. | 348/608 |
| 6,810,084 B1 | * | 10/2004 | Jun et al. | 375/240.28 |
| 6,973,121 B1 | * | 12/2005 | Eberlein et al. | 375/211 |
| 2002/0154247 A1 | * | 10/2002 | Ghosh et al. | 348/614 |
| 2004/0008764 A1 | * | 1/2004 | Seo et al. | 375/229 |
| 2004/0091059 A1 | * | 5/2004 | Chen | 375/269 |
| 2004/0196935 A1 | * | 10/2004 | Nieto | 375/350 |
| 2005/0154967 A1 | * | 7/2005 | Heo et al. | 714/792 |

FOREIGN PATENT DOCUMENTS

KR 1020020088304 11/2002

OTHER PUBLICATIONS

Khalil Salehian, et al., "On-Channel Repeater for Digital Television Broadcasting Service", IEEE Transactions on Broadcasting, vol. 48, No. 2, Jun. 2002 (pp. 97-102).

* cited by examiner

*Primary Examiner*—Shuwang Liu
*Assistant Examiner*—Kenneth Lam
(74) *Attorney, Agent, or Firm*—Blakely, Sokoloff, Taylor & Zafman (57) ABSTRACT

A repeater and method for an ATSC terrestrial digital TV broadcasting service. The on-channel repeater includes: a receiving unit for receiving a Radio Frequency (RF) broadcast signal from a main transmitter; a frequency downlink converting unit for converting the received RF broadcast signal into an intermediate frequency (IF) signal; a demodulating unit for converting the converted IF signal into a baseband signal; an equalizing unit for removing noise and multi-path signals generated from the converted baseband signal; a modulating unit for converting the baseband signal into an IF signal; a frequency uplink converting unit for converting the IF signal into a RF broadcast signal; a high power amplifying unit for amplifying and repeating the converted RF broadcast signal; a transmitting unit for transmitting the RF broadcast signal outputted from the high power amplifying unit; and a signal synchronizing unit for generating the first reference frequency, and generating the second reference frequency based on the first reference frequency such that the transmission/reception signal are frequency-and-phase synchronized.

9 Claims, 7 Drawing Sheets

ON-CHANNEL REPEATING APPARATUS AND METHOD FOR TERRESTRIAL DIGITAL TELEVISION BROADCASTING SERVICE

FIELD OF THE INVENTION

The present invention relates to an on-channel repeating apparatus and method in which an Advanced Television System Committee ATSC terrestrial digital television TV broadcast signal is repeated over an on-channel; and, more particularly, to an on-channel repeater and method for an ATSC terrestrial digital TV broadcasting service, in which a Radio Frequency (Hereinafter, referred to as "RF") broadcast signal transmitted from a main transmitter is converted into a baseband signal. Noise and multi-path signals generated due to a transmission channel between the main transmitter and the on-channel repeater and a feedback signal generated due to low isolation of transmission/reception antennas of the on-channel repeater are removed from the converted baseband signal by using a high performance equalizer, and the converted baseband signal is again converted into a RF broadcast signal such that the same output signal as an input signal of the on-channel repeater is repeated over an on-channel.

DESCRIPTION OF THE PRIOR ART

Generally, to provide a broadcasting service, a main transmitter and a repeater are disposed depending on a peripheral topography and natural feature, and depending on a service area of a broadcasting company. The repeater is installed at an area where a weak broadcast signal is received from the main transmitter, and operates to strengthen the signal and to increase a signal transmission area from the main transmitter.

Figure 1:
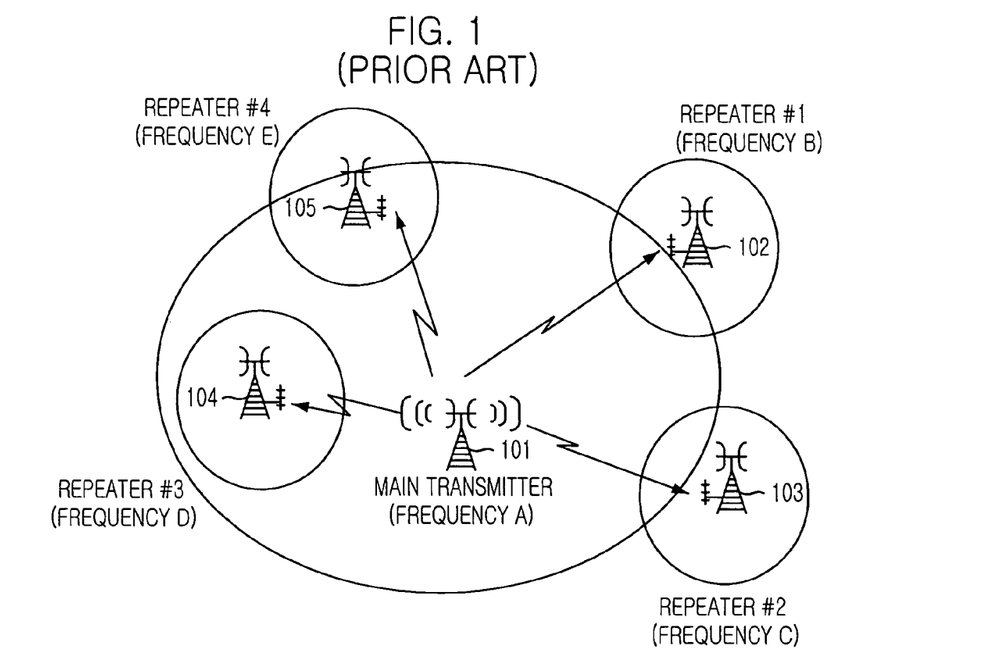
FIG. 1 is a view depicting an example of a broadcasting service using a conventional repeater.

FIG. 1 is a view depicting an example of a broadcasting service using a conventional repeater, and illustrates each repeater using frequencies different from one another.

As shown in FIG. 1, in the broadcasting service using the conventional repeater, first, a main transmitter 101 transmits a broadcast signal using a transmission frequency (A), and each of repeaters 102 to 105 repeats a signal using a different frequency from the transmission frequency (A). However, since the conventional repeater of FIG. 1 assigns a different frequency to each of the repeaters 102 to 105 to solve the weak signal problem for the signal received from the main transmitter 101 or to increase the broadcast zone, the conventional repeater is inefficient in frequency utilization in that each of the repeaters 102 to 105 uses a plurality of frequency bands which in turn utilizes a large amount of frequency resources.

Figure 2:
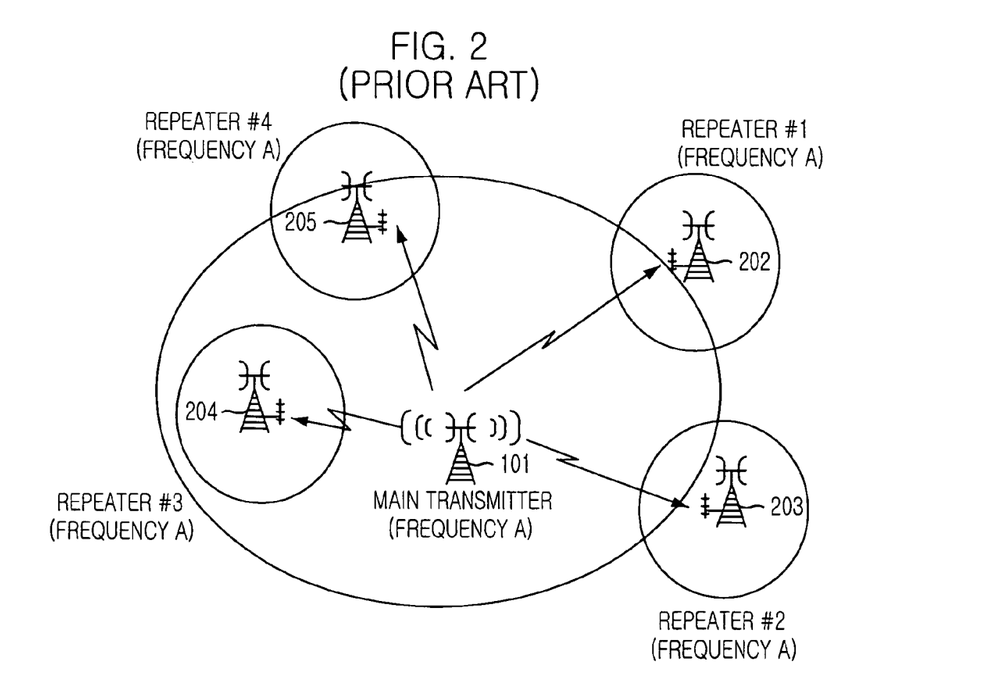
FIG. 2 is a view depicting another example of a broadcasting service using a conventional repeater.

FIG. 2 is a view depicting another example of the broadcasting service using the conventional repeater, and illustrates a conceptual view of the broadcasting service in which the on-channel repeater repeats using the same frequency. In other words, a main transmitter 201 transmits a broadcast signal using a transmission frequency (A), and each of the on-channel repeaters 202 to 205 repeats the broadcast signal using the same frequency as the transmission frequency (A). In order to enable the broadcasting service, a receiver should be able to distinguish from one another the broadcast signals transmitted from the main transmitter 201 and the on-channel repeaters 202 to 205 using the same frequency band.

Generally, a receiver includes an equalizer to eliminate multipath signals and the equalizer also eliminates delayed input signals having an identical frequency.

However, if signals from the main transmitter 201 and the on-channel repeaters 202 to 205 using the same frequency bandwidth are not identical, the signals become noise signals relative to each other. These noise signals cannot be eliminated by the equalizer. Furthermore, if each of signals from the main transmitter 201 and the on-channel repeaters 202 to 205 is delayed as long as a predetermined time that could not be permitted to the equalizer, the equalizer would not eliminate the delayed signal.

Accordingly, in order to provide a digital broadcasting service using the on-channel repeater, it is required as a precondition that the output signal of the on-channel repeater should be the same as the output signal of the main transmitter, and time-delaying of the two output signals should be low.

The following explanation is provided to illustrate the drawbacks occurring when a terrestrial digital TV broadcast signal is repeated using the conventional on-channel repeater with reference to FIGS. 3 to 7.

Figure 3:
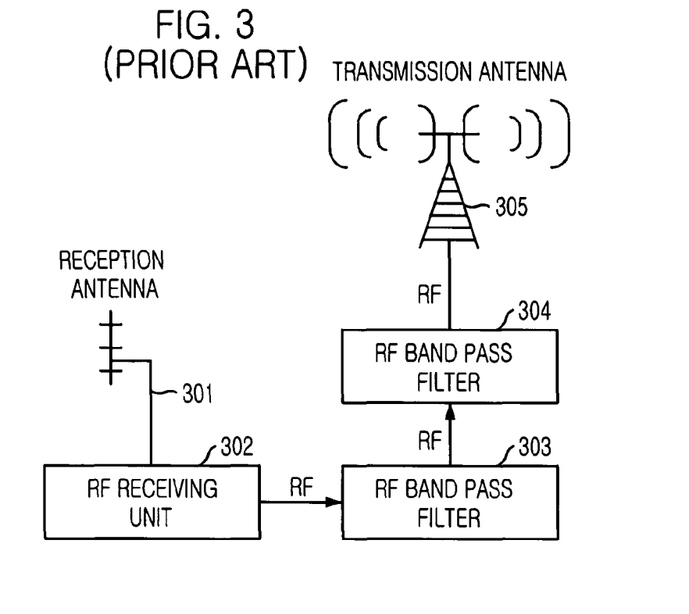
FIG. 3 is an exemplary view illustrating a construction of a conventional RF amplification on-channel repeater.

FIG. 3 is an exemplary view illustrating a construction of a conventional RF amplification on-channel repeater.

As shown in FIG. 3, in the conventional RF amplification on-channel repeater, a RF broadcast signal is received from a main transmitter through a reception antenna 301 and a RF reception unit 302, the received RF signal passes through a RF band pass filter 303 only at a desired signal band, the band passed RF signal is amplified through a high power amplifying unit 304 and then transmitted through a transmission antenna 305 of the on-channel repeater over an on-channel. The RF amplification on-channel repeater has a characteristic of a low system delay (about 0.5 µs) and a simple structure.

Figure 4:
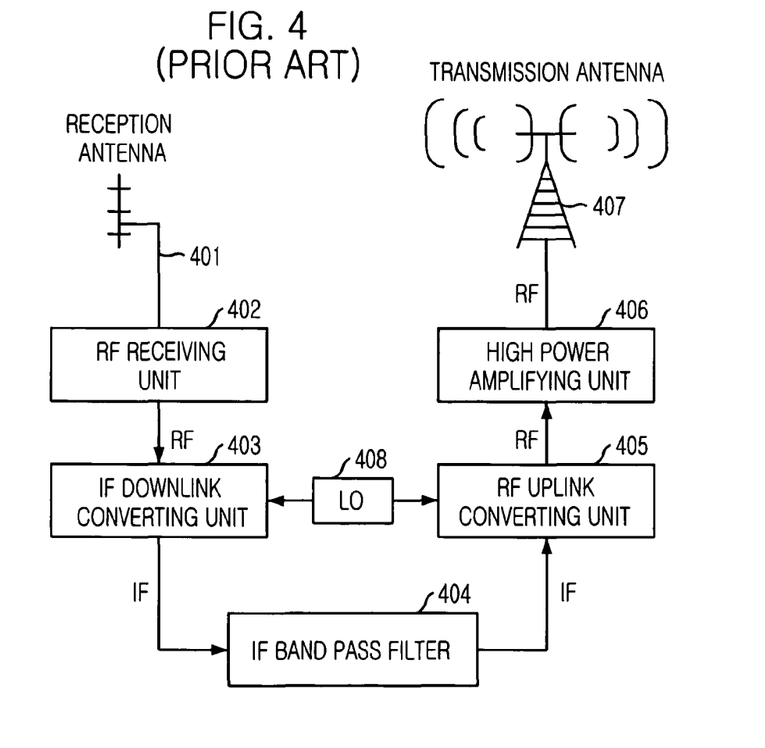
FIG. 4 is an exemplary view illustrating a construction of a conventional IF conversion on-channel repeater.

FIG. 4 is an exemplary view illustrating a construction of a conventional IF conversion on-channel repeater.

As shown in FIG. 4, in the conventional IF conversion on-channel repeater, a RF broadcast signal is received from a main transmitter through a reception antenna 401 and a RF reception unit 402. The received RF signal is converted into an IF signal through an IF downlink converting unit 403, and the IF signal passes through the IF band pass filter 404 only at a desired signal band. The band passed IF signal is converted into a RF broadcast signal through the RF uplink converting unit 405, and the RF broadcast signal is amplified through a high power amplification unit 406 and then transmitted through a transmission antenna 407. The IF conversion on-channel repeater has also a low system delay (about 1 µs) and a simple structure. Further, a selection characteristic of the band pass filter is superior to that of the RF amplification on-channel repeater of FIG. 3.

Figure 5:
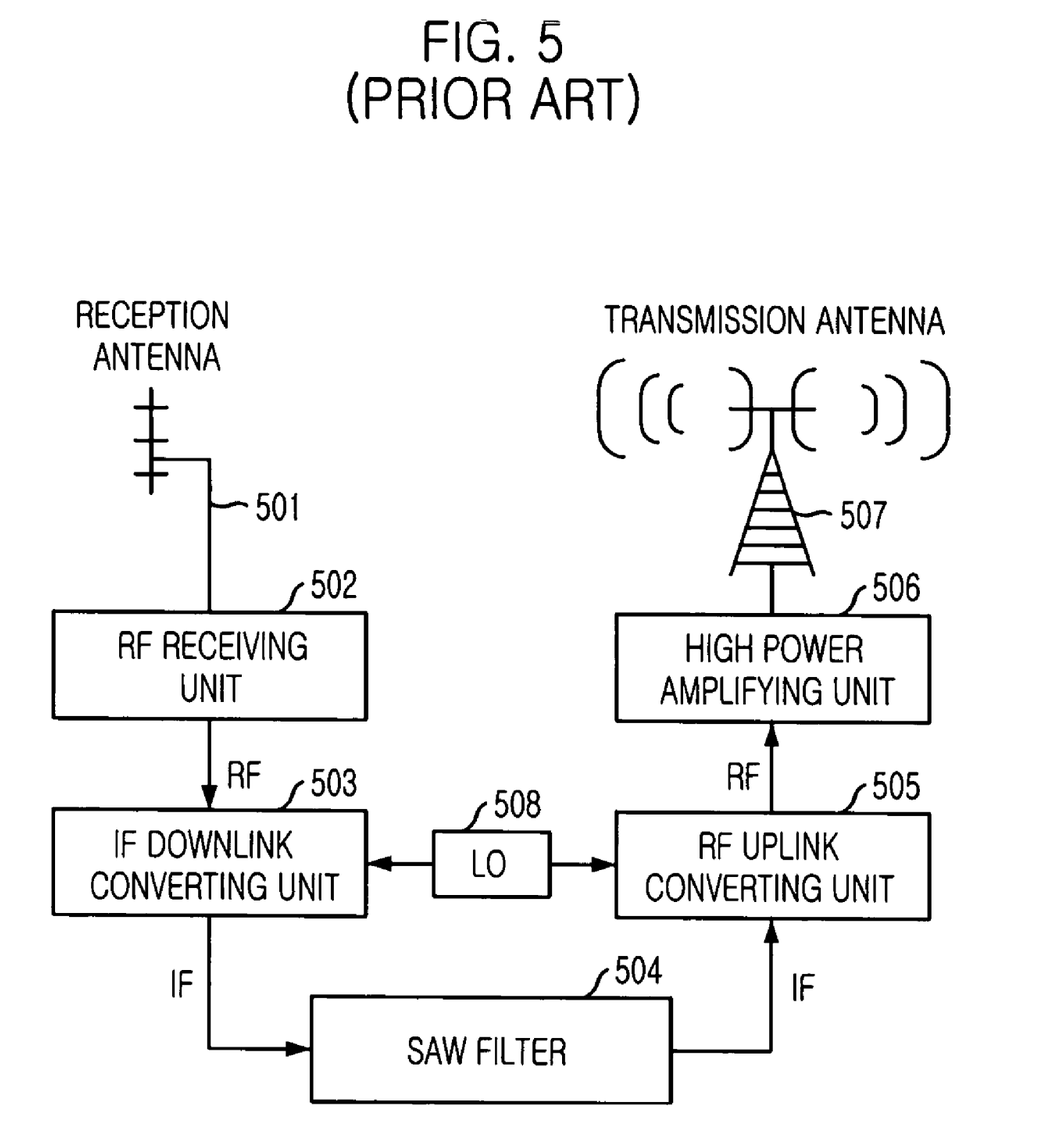
FIG. 5 is an exemplary view illustrating a construction of a conventional SAW filter on-channel repeater.

FIG. 5 is an exemplary view illustrating a construction of a conventional SAW filter on-channel repeater.

As shown in FIG. 5, in the conventional SAW filter on-channel repeater, a RF broadcast signal is received from a main transmitter through a reception antenna 501 and a RF reception unit 502, and the received RF broadcast signal is converted into an IF signal through an IF downlink converting unit 503. The IF signal passes through an IF band pass filter 504 only at a desired signal band, and the band passed IF signal is converted into a RF broadcast signal through a RF uplink converting unit 505. The RF broad signal is amplified through a high power amplification unit 506 and then transmitted through a transmission antenna 507. The SAW filter on-channel repeater has also a low system delay (about 2 µs) and a simple structure. Further, a selection characteristic of the band pass filter is superior to that of the IF conversion on-channel repeater of FIG. 4.

Figure 6:
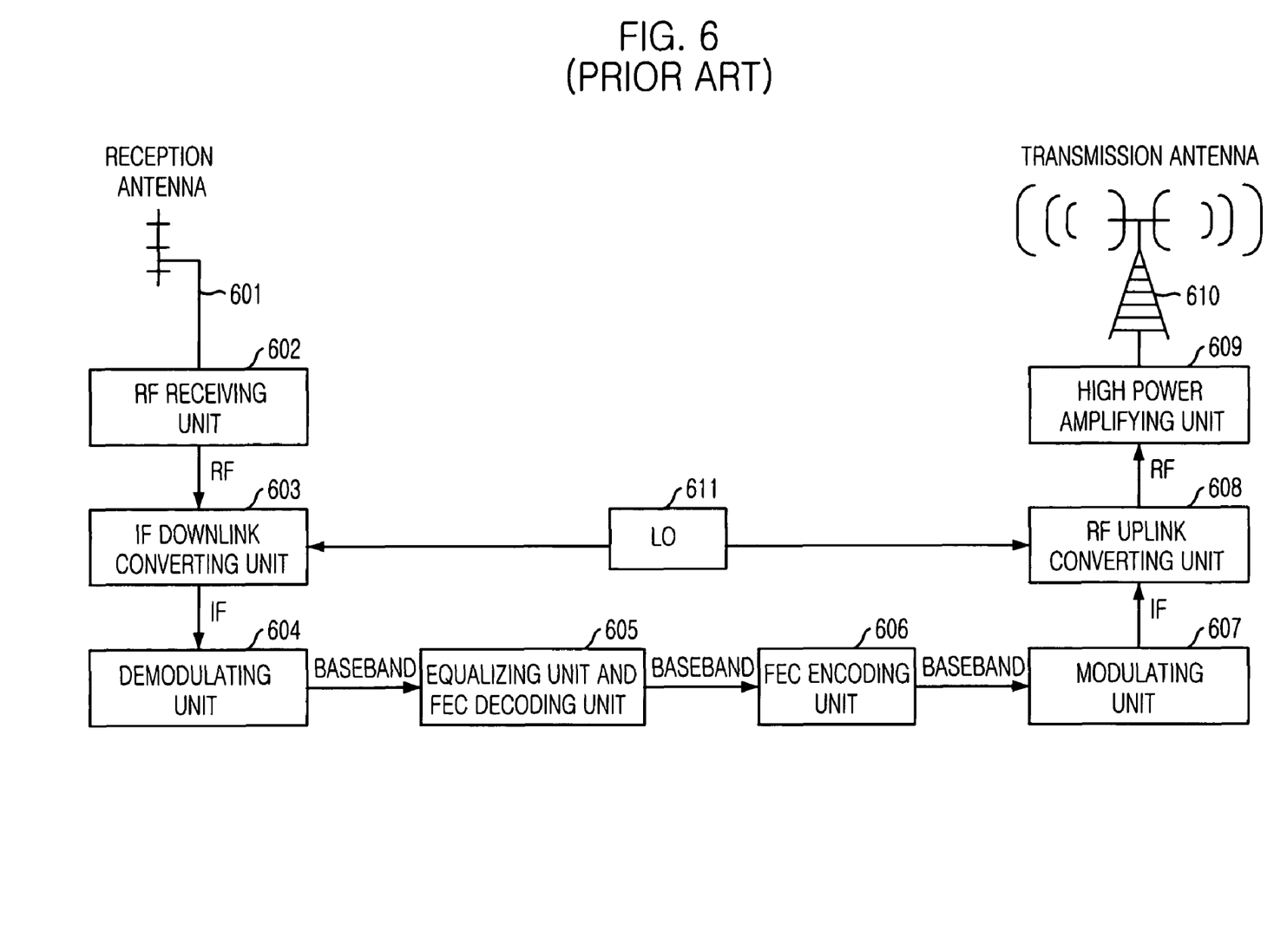
FIG. 6 is an exemplary view illustrating a construction of a conventional demodulation/modulation on-channel repeater.

FIG. 6 is an exemplary view illustrating a construction of a conventional demodulation/modulation on-channel repeater.

As shown in FIG. 6, in the conventional demodulation/modulation on-channel repeater, a RF broadcast signal is received from a main transmitter through a reception antenna 601 and a RF reception unit 602. The received RF broadcast signal is converted into an IF signal through an IF downlink converting unit 603. The IF signal is converted into a baseband signal through a demodulator 604. The noise and multi-path signals generated due to the transmission channel between the main transmitter and the on-channel repeater are removed from the converted baseband signal in an equalizer and forward error correction (FEC) decoder 605. The output signal of the equalizer and FEC decoder 605 is error-correction encoded (Referring to ATSC A.53) through FEC encoding unit 606. The FEC-encoded signal is converted into an IF broadcasting band signal through a modulator 607. The converted IF signal is converted into a RF broadcast signal through a RF uplink converting unit 608, and the RF broadcast signal is amplified through a high power amplification unit 609 and then transmitted through a transmission antenna 610. Since the demodulation/modulation on-channel repeater can remove the noise and multi-path signals generated due to the transmission channel between the main transmitter and the on-channel repeater, a characteristic of the output signal of the on-channel repeater is superior to that of the input signal of the on-channel repeater.

However, the above mentioned conventional on-channel repeaters shown in FIGS. 3 to 6 have drawbacks in that the transmission output of the on-channel repeater is limited due to the feedback signal generated due to the low isolation of the transmission/reception antennas.

Moreover, in the conventional on-channel repeater in FIGS. 3 to 5, the characteristics of the output signals of the on-channel repeaters are inferior to those of the input signals of the on-channel repeaters since the noise and multi-path signals generated due to the transmission channel between the main transmitter and the on-channel repeater, the feedback signal generated due to the low isolation of the transmission/reception antennas, and a system noise added from an on-channel repeater system, etc. cannot be removed. Further, a phase noise generated due to a local oscillator (LO) is added to the transmission signal.

Figure 7:
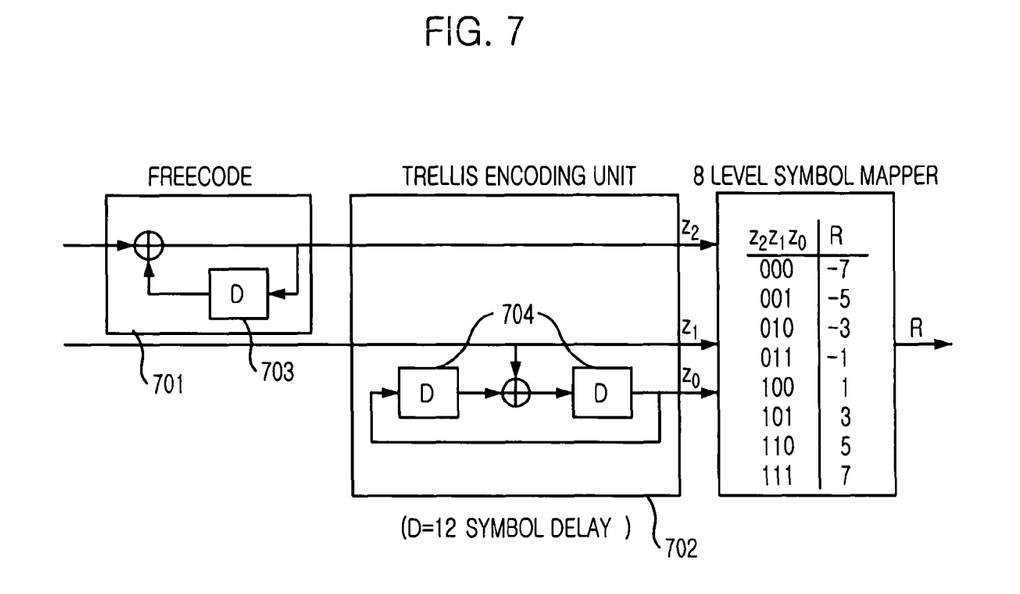
FIG. 7 is an exemplary view illustrating a construction of a general ATSC standard trellis encoder.

In the conventional on-channel repeater in FIG. 6, since the output signal generated due to ambiguity of a general ATSC standard trellis encoder of FIG. 7 is recognized as a noise, it is not removed by receiver equalizer.

Accordingly, an on-channel repeater is required for solving the above-mentioned drawbacks, that is, for allowing the output signal thereof to be the same as the output signal of the main transmitter, for allowing low time-delaying of the two output signals, for removing the noise and multi-path signals generated due to the transmission channel between the main transmitter and the on-channel repeater such that the on-channel repeater has a superior characteristic of the output signal to that of the input signal, and for removing the feedback signal generated due to the low isolation of the transmission/reception antennas such that the transmission output power of the on-channel repeater can be increased.

SUMMARY OF THE INVENTION

It is, therefore, an object of the present invention to provide an on-channel repeater and method for an ATSC terrestrial digital TV broadcasting service, for repeating the same output signal as an input signal of the on-channel repeater over an on-channel by converting a RF broadcast signal transmitted from a main transmitter into a baseband signal, removing noise and multi-path signals generated due to a transmission channel between the main transmitter and the on-channel repeater and a feedback signal generated due to low isolation of transmission/reception antennas, from the converted baseband signal through a high performance equalizer, and then again converting the baseband signal into a RF broadcast signal.

In accordance with one aspect of the present invention, there is provided an on-channel repeater for an Advanced Television System Committee (ATSC) terrestrial digital TV broadcasting service, in which a terrestrial digital television broadcast signal is repeated over an on-channel. The on-channel repeater includes: a receiving unit for receiving a Radio Frequency (RF) broadcast signal from a main transmitter; a frequency downlink converting unit for converting the received RF broadcast signal into an intermediate frequency (IF) signal based on a first reference frequency; a demodulating unit for converting the converted IF signal into a baseband signal; an equalizing unit for removing noise and multi-path signals generated between the main transmitter and the on-channel repeater from the converted baseband signal; a modulating unit for converting the baseband signal outputted from the equalizing unit, into an IF signal; a frequency uplink converting unit for converting the IF signal into a RF broadcast signal based on a second reference frequency; a high power amplifying unit for amplifying and repeating the converted RF broadcast signal; a transmitting unit for transmitting the RF broadcast signal outputted from the high power amplifying unit; and a signal synchronizing unit for generating the first reference frequency to provide the generated first reference frequency for the IF downlink converting unit to the demodulating unit which shifts the IF signal to the baseband signal, and generating the second reference frequency based on the first reference frequency to provide the generated second reference frequency for the RF uplink converting unit such that the transmission/reception signal are frequency-and-phase synchronized.

In accordance with another aspect of the present invention, there is provided an on-channel repeating method of an on-channel repeater, the on-channel repeating method including: a first step of receiving a Radio Frequency (RF) broadcast signal from a main transmitter to convert the received RF broadcast signal into an intermediate frequency (IF) signal based on a first reference frequency; a second step of converting the downlink-converted IF signal into a baseband signal, and removing predetermined unnecessary signals such as noise and multi-path signals generated between a main transmitter and the on-channel repeater, from the converted baseband signal; a third step of, at the time of transmission, converting the baseband signal without the noise and multi-path signals into an IF signal, and then converting the converted IF signal into a RF broadcast signal based on the second reference frequency based on the first reference frequency so as to perform a frequency and phase synchronization with the received broadcast signal; and a fourth step of amplifying and transmitting the uplink-converted RF broadcast signal.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Figure 8:
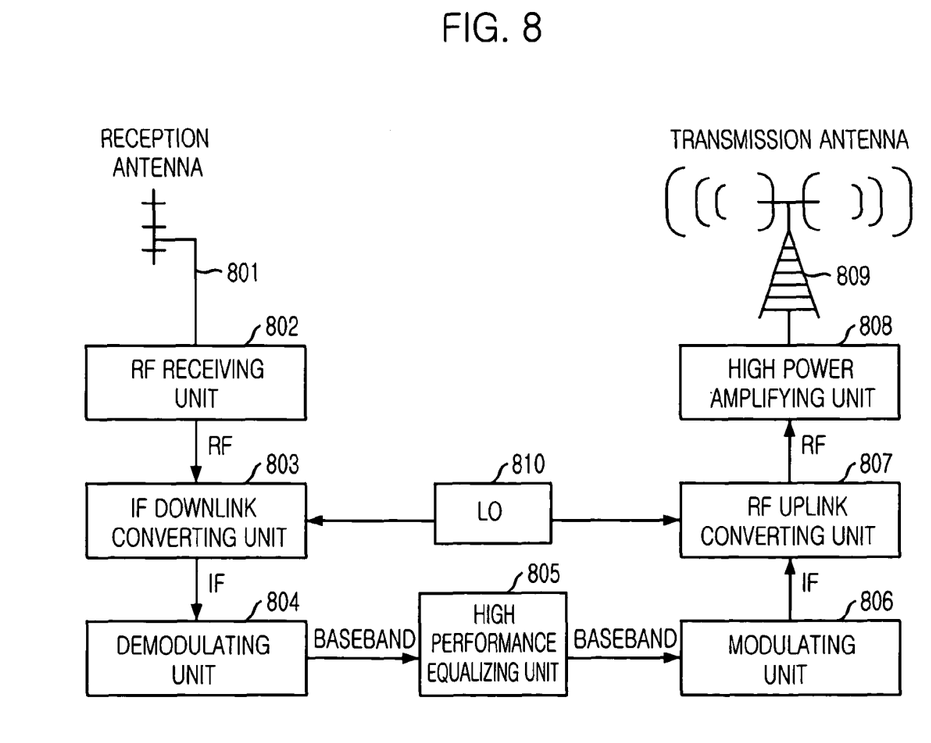
FIG. 8 is a view illustrating a construction of an on-channel repeater in accordance with a preferred embodiment of the present invention.

FIG. 8 is an exemplary view illustrating a construction of an on-channel repeater in accordance with a preferred embodiment of the present invention.

Referring to FIG. 8, the on-channel repeater includes a RF receiving unit 802, an IF downlink converting unit 803, a demodulating unit 804, an equalizing unit 805, a modulating unit 806, a RF uplink converting unit 807, a high power amplifying unit 808, a transmission antenna 809 and a local oscillator (LO) 810.

Each element of the on-channel repeater is briefly explained hereinafter.

The RF receiving unit 802 receives a RF (Radio Frequency) broadcast signal from a main transmitter through a reception antenna 801.

The IF downlink converting unit 803 converts the received RF broadcast signal into an IF (intermediate frequency) signal based on a first reference frequency.

The demodulating unit 804 converts the converted IF signal into a baseband signal.

The equalizing unit 805 removes noise and multi-path signals generated between the main transmitter and the on-channel repeater and a feedback signal from the converted baseband signal.

The modulating unit 806 converts the baseband signal outputted from the equalizing unit 805 into an IF signal.

The RF uplink converting unit 807 converts the converted IF signal into a RF broadcast signal based on a second reference frequency.

The high power amplifying unit 808 amplifies and repeats the converted RF broadcast signal.

The transmission antenna 809 transmits the broadcast signal outputted from the high power amplifying unit 808.

The local oscillator (LO) 810 generates the first reference frequency to provide the generated first reference frequency for the IF downlink converting unit 803 to the demodulating unit 804 which shifts the IF signal to the baseband signal, and generates the second reference frequency based on the first reference frequency to provide the generated second reference frequency for the RF uplink converting unit 807 such that a frequency and a phase of the transmission/reception signal are synchronized.

The on-channel repeater in accordance with the present invention will be described in more detail as follows.

First, the reception antenna 801 and the RF receiving unit 802 receive the RF broadcast signal from the main transmitter. The IF downlink converting unit 803 converts the received RF signal into the IF signal and the demodulating unit 804 converts the IF signal into the baseband signal. The high performance equalizing unit 805 removes the noise and multi-path signals generated due to the transmission channel between the main transmitter and the on-channel repeater. The high performance equalizing unit 805 also removes the feedback signal generated due to the low isolation of the transmission/reception antennas of the on-channel repeater, from the converted baseband signal. The modulating unit 806 converts the baseband signal from which the noise and multi-path signals and the feedback signal are removed, into the IF broadcast signal. The RF uplink converting unit 807 converts the IF signal into the RF signal, and the high power amplifying unit 808 amplifies the RF signal and then the transmission antenna 809 transmits the amplified RF signal.

A method for frequency-and-phase synchronizing with signals of a transmission stage and a reception stage will be described as follows.

The LO 810 functions to shift the signal applied to the RF receiving unit 802 to a desired fixed IF band. Accordingly, a frequency of the LO 810 should be varied depending on the RF signal band selected, and this process is called "tunning". Further, the frequency of the LO 810 should be maintained to be at a frequency and phase synchronization state with a pilot signal included in the input RF signal. If the LO 810 is not maintained to be at the frequency and phase synchronization state, the LO 810 used in a shift process from the IF band to the baseband should be necessarily maintained to be at the frequency and phase synchronization state with the pilot signal included in the input IF band signal. For this synchronization restoration, the demodulating unit 804 includes a carrier restoring unit for performing the frequency and phase synchronization with the pilot signal of the input signal, and uses a control signal generated from the carrier restoring unit to allow the frequency and phase synchronization in the LO 810 for shifting to the IF or RF stage with the pilot signal of the received signal. If the LO 810 for the frequency and phase synchronization with the pilot signals of the input RF or IF band is used, the received RF band signal can be converted into a frequency-and-phase synchronized signal, that is, into the baseband signal. In other words, a coherent demodulation can be performed.

As described above, the LO signal synchronized with the pilot signal of the received signal allows the baseband signal to be shifted to the IF band at the transmission stage, and the IF band signal is shifted to the RF signal through the LO signal. As described above, since the frequency-and-phase-synchronized LO signal with the pilot signal of the signal input to the reception stage is used at the reception stage and the transmission stage such that the output signal from the transmission stage of the on-channel repeater is frequency-and-phase synchronized with the received signal, the output signal of the repeater can be allowed to be frequency-and-phase synchronized with the signal generated from the main transmitter even without a separate reference signal.

The on-channel repeater in accordance with the present invention does not cause an ambiguity drawback that the input and output signals are different from each other since error correction decoding and encoding units are not used, and has better characteristics of the output signal than that of the input signal since the noise and multi-path signals generated due to the transmission channel between the main transmitter and the on-channel repeater are removed using the high performance equalizer. Further, the invented on-channel repeater has an increased transmission output since the feedback signal generated due to the low isolation of the transmission/reception antennas can be removed at the equalizer. Additionally, the invented on-channel repeater has a relative low system delay (less than 5 μs).

Figure 9:
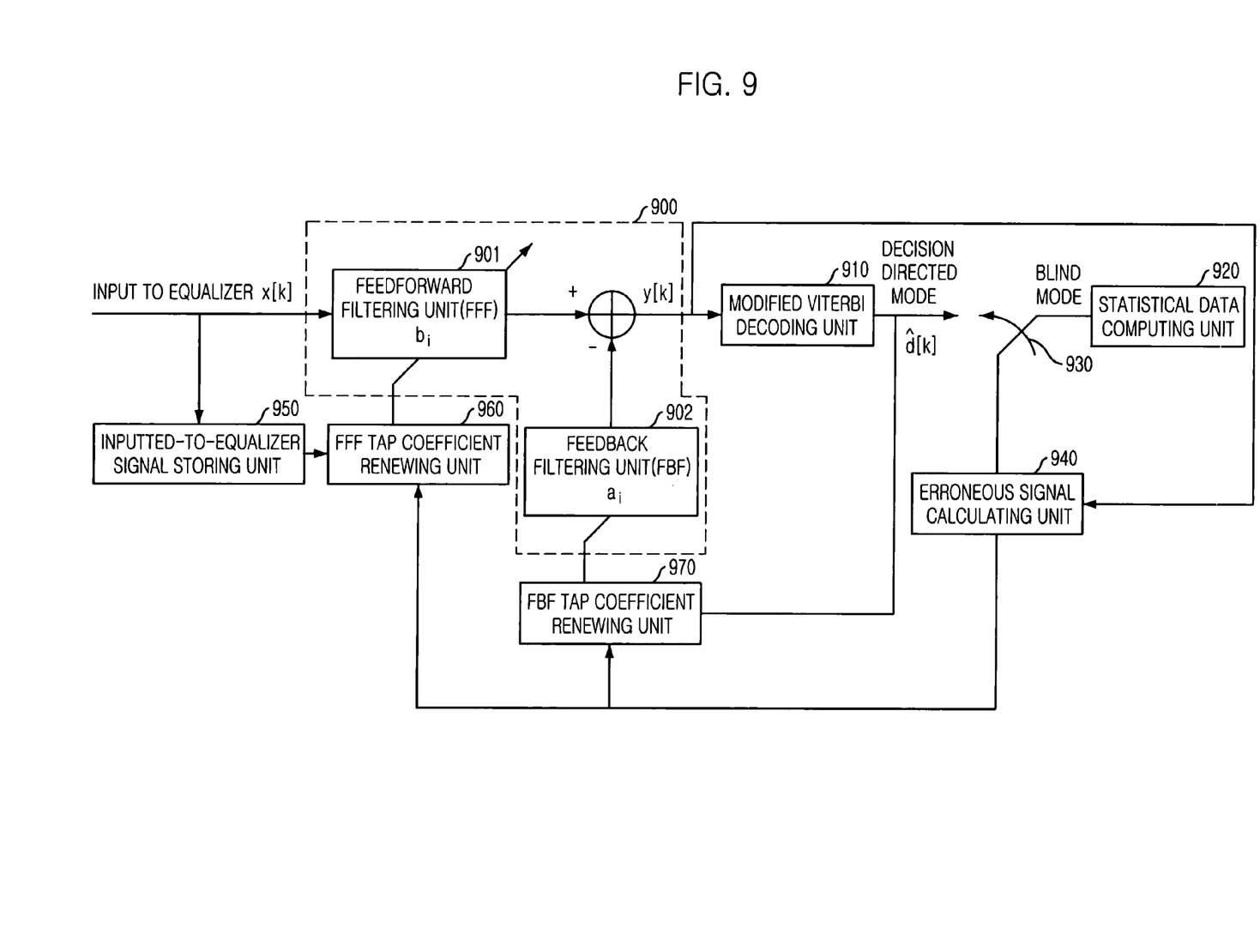
FIG. 9 is a view illustrating a construction of an equalizing unit of an on-channel repeater in accordance with a preferred embodiment of the present invention.

FIG. 9 is an exemplary view illustrating a construction of the equalizing unit of the on-channel repeater in accordance with a preferred embodiment of the present invention.

Referring to FIG. 9, the equalizing unit 805 of the on-channel repeater in accordance with the present invention includes a main filtering unit 900, a modified viterbi decoder 910, a statistical data computing unit 920, a switching unit 930, an error signal calculating unit 940, an input-to-equalizer signal storing unit 950, a FFF (FeedForward Filtering) tap coefficient renewing unit 960 and a FBF (FeedBackward Filtering) tap coefficient renewing unit 970.

Hereinafter, each element of the equalizing unit 805 is briefly explained.

The main filtering unit 900 performs a channel equalization by repetitively filtering the signal input or applied from the demodulating unit 804.

The modified viterbi decoder 910 detects a symbol from a digital broadcast signal received from the main filtering unit 900 by using a modified viterbi decoding algorithm with a Trace Back Depth TBD being to reduce complexity.

The statistical data computing unit 920 computes necessary statistical data in a blind mode.

The switching unit 930 selects an output signal in a decision directed mode or a blind mode.

The error signal calculating unit 940 compares an output signal y[k] of the main filtering unit 900 with an output signal d̂[k] of the modified viterbi decoder 910 or an output signal of the statistical data computing unit 920 to calculate an error signal e[k].

The input-to-equalizer signal storing unit 950 stores a signal input from the demodulating unit 804.

The FeedForward Filtering FFF tap coefficient renewing unit 960 renews a tap coefficient $b_i$ applied to the FeedForward Filtering unit FFF 901 by using the output signal of the input-to-equalizer signal storing unit 950 and the calculated error signal e[k].

The FBF tap coefficient renewing unit 970 renews the tap coefficient $a_i$ applied to the feedback filtering unit FBF 902 by using the output signal d̂[k] of the modified viterbi decoder 910 and the calculated error signal e[k].

Hereinafter, operations of the equalizing unit 805 are explained in detail.

First, the main filtering unit 900 performs the channel equalization by repetitively filtering the signal input or applied from an external (demodulator 804), and the modified viterbi decoder 910 detects the symbol from the digital broadcast signal received from the main filtering unit 900 by using the modified viterbi decoding algorithm with the TBD being one and the complexity being reduced.

The statistical data computing unit 920 computes the necessary statistical data in the blind mode, and the switching unit 930 selects the output signal in the decision directed mode or the blind mode.

The error signal calculating unit 940 compares the output signal y[k] of the main filtering unit 900 with the output signal d̂[k] of the modified viterbi decoder 910 or the output signal of the statistical data computing unit 920 to calculate the error signal e[k].

The FFF tap coefficient renewing unit 960 renews the tap coefficient $b_i$ applied to the FeedForward Filtering unit (FFF) 901 by using the output signal of the input-to-equalizer signal storing unit 950 and the calculated error signal e[k], and the FBF tap coefficient renewing unit 970 renews the tap coefficient $a_i$ applied to the feedback filtering unit (FBF) 902 by using the output signal d̂[k] of the modified viterbi decoder 910 and the calculated error signal e[k].

The symbol detector of the equalizer used in the on-channel repeater in accordance with the present invention can also use a viterbi decoder, a SOVA (soft output viterbi algorithm) decoder and a simple slicer as well as the modified viterbi decoder 910. Further, in order to remove the noise signal generated due to the transmission channel between the main transmitter and the on-channel repeater the training sequence is used as a output signal of the equalizer at a data duration having the training sequence, and the output signal of the symbol detector is used as a output signal of the equalizer at a data duration not including the training sequence.

Accordingly, the above-constructed on-channel repeater allows the output signal therefrom to be the same as the output signal of the main transmitter, allows the low time-delaying of the two output signals, allows the noise and multi-path signals generated due to the transmission channel between the main transmitter and the on-channel repeater to be removed to have better output signal characteristics than the input signal characteristic, and allows the feedback signal generated due to the low isolation of the transmission/reception antennas to be removed therefrom to increase the transmission output power thereof.

Figure 10:
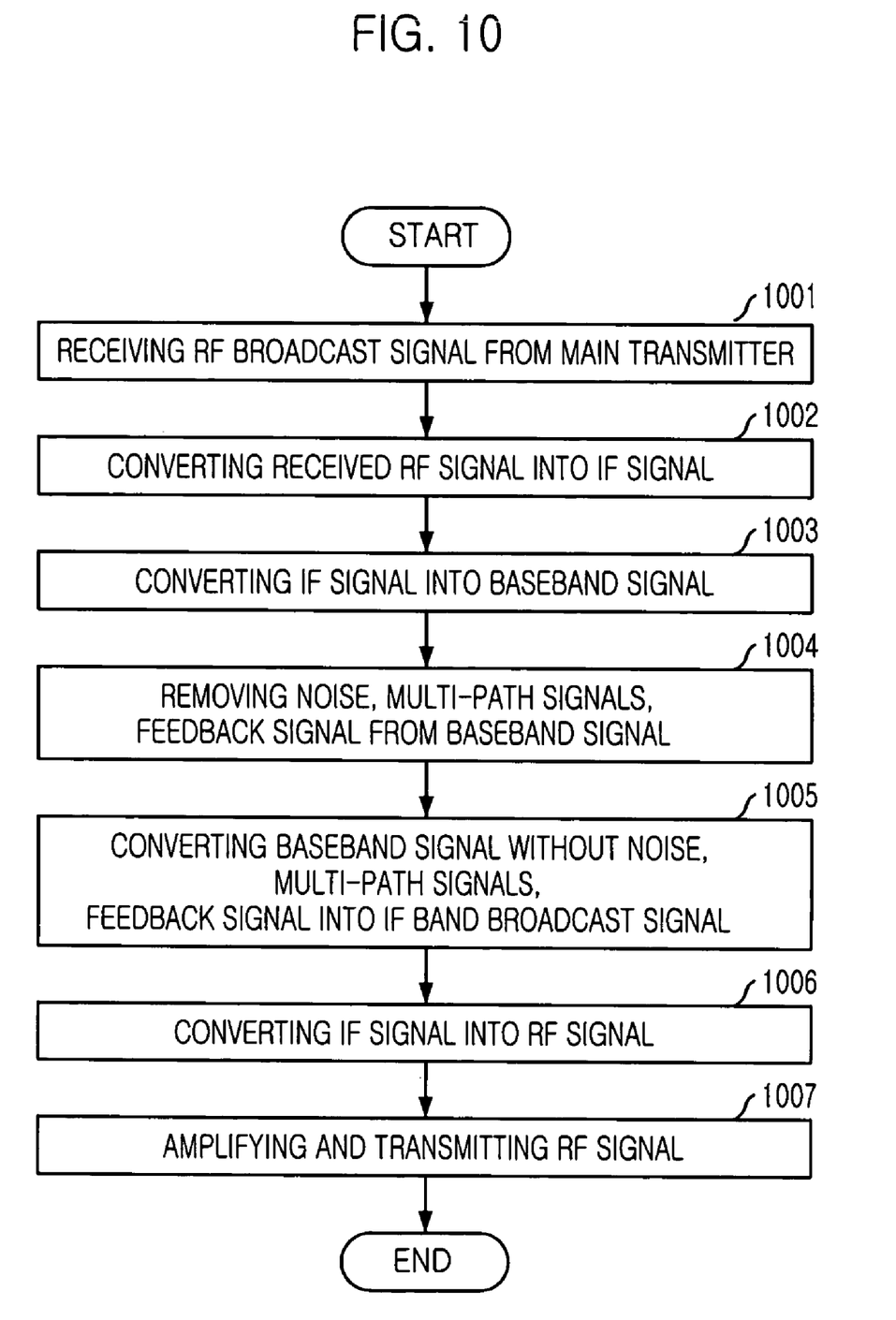
FIG. 10 is a flow chart illustrating a repeating method of an on-channel repeater in accordance with a preferred embodiment of the present invention.

FIG. 10 is a flow chart illustrating a repeating method of the on-channel repeater in accordance with a preferred embodiment of the present invention.

As shown in FIG. 10, in the repeating method of the on-channel repeater in accordance with the present invention, the RF broadcast signal is received from the main transmitter (step 1001), and the received RF broadcast signal is converted into the IF signal at step 1002.

Next, the IF signal is converted into the baseband signal at step 1003 such that the noise and multi-path signals generated due to the transmission channel between the main transmitter and the on-channel repeater and the feedback signal generated due to the low isolation of the transmission/reception antennas are removed from the baseband signal at step 1004.

And then, the baseband signal without the noise and multi-path signals and the feedback signal, etc. is converted into an IF band broadcast signal at step 1005, and the IF signal is converted into the RF signal at step 1006 to amplify and transmit the RF signal at step 1007.

As described above, the present invention has an effect that a usage efficiency of a limited frequency resource can be increased since the digital TV broadcasting service can be repeated through the on-channel repeater.

While the present invention has been described with respect to the particular embodiments, it will be apparent to those skilled in the art that various changes and modifications may be made without departing from the scope of the invention as defined in the following claims.

What is claimed is:

1. An on-channel repeating apparatus for an Advanced Television System Committee (ATSC) terrestrial digital TV broadcasting service, in which a terrestrial digital television broadcast signal is repeated over an on-channel, the on-channel repeating apparatus comprising:

a receiving unit for receiving a Radio Frequency (RF) broadcast signal from a main transmitter;

a frequency downlink converting unit for converting the received RF broadcast signal into an intermediate frequency (IF) signal based on a first reference frequency;

a demodulating unit for converting the converted IF signal into a baseband signal;

an equalizing unit for removing a predetermined signal generated between the main transmitter and the on-channel repeater from the converted baseband signal, wherein the predetermined signal includes a noise signal and a multi-path signal generated due to a transmission channel between the main transmitter and the on-channel repeating apparatus, and a feedback signal generated due to low isolation of transmission or reception antennas;

a modulating unit for converting the baseband signal received directly from the equalizing unit, into an IF signal;

a frequency uplink converting unit for converting the IF signal into a RF broadcast signal based on a second reference frequency;

a high power amplifying unit for amplifying and repeating the converted RF broadcast signal;

a transmitting unit for transmitting the RF broadcast signal outputted from the high power amplifying unit; and a signal synchronizing unit for generating the first reference frequency to provide the generated first reference frequency for the IF downlink converting unit to the demodulating unit which shifts the IF signal to the baseband signal, and generating the second reference frequency based on the first reference frequency to provide the generated second reference frequency for the RF uplink converting unit such that the transmission/reception signal are frequency-and-phase synchronized.

2. The on-channel repeating apparatus as recited in claim 1, wherein the receiving unit includes:

a reception antenna for receiving the RF broadcast signal from the main transmitter; and a RF receiving unit for receiving the RF broadcast signal from the reception antenna.

3. The on-channel repeating apparatus as recited in claim 1, wherein the equalizing unit includes:

an input-to-equalizer signal storing unit for storing the signal inputted from the demodulating unit therein;

a filtering unit for performing channel equalization by repetitively filtering the signal input from the demodulating unit;

a modified viterbi decoding unit for detecting a symbol representing decision data from the output signal transmitted through the filtering unit by using a modified viterbi decoding algorithm with a Trace Back Depth TBD being one and a complexity being reduced to output the detected symbol at a decision directed mode;

a statistical data computing unit for computing and outputting necessary statistical error data at a blind mode;

a switching unit for selecting an output signal in one of the decision directed mode and the blind mode;

an error signal calculating unit for comparing the output signal representing decision data or statistical error data in the decision directed mode or the bind mode selected by the switching unit with an output signal as decision feedback equalization data of the filtering unit to calculate the error signal;

a FFF tap coefficient renewing unit for renewing a tap coefficient applied to a feedback filter unit (FFF) by using an output signal of the input-to-equalizer signal storing unit and the calculated error signal; and a FBF tap coefficient renewing unit for renewing a tap coefficient applied to the feedback filtering unit (FBF) by using the output signal of the modified viterbi decoding unit and the calculated error signal.

4. The on-channel repeating apparatus as recited in claim 3, wherein the equalizing unit use a viterbi decoder, a modified viterbi decoder, a Soft Output Viterbi Algorithm SOVA decoder and a simple slicer as a symbol detector.

5. The on-channel repeating apparatus as recited in claim 4, wherein the equalizing unit uses a training sequence as an output signal thereof at a data duration including the training sequence, and uses an output signal of the symbol detector as an output signal of the on-channel repeating apparatus at a data duration excluding training sequence.

6. An on-channel repeating method of an on-channel repeater, the on-channel repeating method comprising the steps of:

a) receiving a Radio Frequency (RF) broadcast signal from a main transmitter to convert the received RF broadcast signal into an intermediate frequency (IF) signal based on a first reference frequency;

b) converting the downlink-converted IF signal into a baseband signal, and removing a certain predetermined signal generated between a main transmitter and the on-channel repeater, from the converted baseband signal, wherein the predetermined signal includes a noise signal and a multi-path signal generated due to a transmission channel between the main transmitter and the on-channel repeater, and a feedback signal generated due to a low isolation of transmission or reception antennas;

c) at the time of transmission, converting the baseband signal without the predetermined signal directly into an IF signal, and then converting the converted IF signal into a RF broadcast signal based on the second reference frequency based on the first reference frequency so as to perform a frequency and phase synchronization with the received broadcast signal; and d) amplifying and transmitting the uplink-converted RF broadcast signal.

7. The on-channel repeating method as recited in claim 6, wherein in the step b), one of a viterbi decoder, a modified viterbi decoder, a SOVA (Soft Output Viterbi Algorithm) decoder and a simple slicer is used as a symbol detector.

8. The on-channel repeating method as recited in claim 7, wherein in the step b), a training sequence is used as an output signal of the equalizing unit at a duration including the training sequence, and an output signal of the symbol detector is used as an output signal of an equalizing unit at a duration excluding the training sequence.

9. The on-channel repeating method as recited in claim 6, wherein the RF broadcast signal of the fourth step is a signal having the same frequency and phase as those of the received RF broadcast signal.

* * * * *